United States Patent
Tucker

[11] Patent Number: 5,282,336
[45] Date of Patent: Feb. 1, 1994

[54] VEHICLE ACTUATED FENCE GATE

[76] Inventor: Walt Tucker, 1682 Pleasant View Dr., Victor, Mont. 59875

[21] Appl. No.: 962,840

[22] Filed: Oct. 19, 1992

[51] Int. Cl.⁵ .............................................. E05F 15/20
[52] U.S. Cl. .......................................... 49/21; 49/30; 49/137; 292/231; 292/180
[58] Field of Search .................... 49/13, 21, 23, 29, 30, 49/137, 273, 236, 264, 386, 327; 137/386, 388; 292/201, 180, 231, 235, 236

[56] References Cited

U.S. PATENT DOCUMENTS

| | | | |
|---|---|---|---|
| 656,812 | 8/1900 | Cockerill | 292/201 X |
| 2,442,572 | 6/1948 | Sheehan | 292/180 X |
| 2,538,470 | 11/1951 | Peeples | 49/30 X |
| 2,599,211 | 6/1952 | Tilbury | 49/364 X |
| 2,606,022 | 8/1952 | Vander Veer et al. | 49/30 X |
| 2,629,191 | 2/1953 | Koch et al. | 49/364 X |
| 2,793,450 | 5/1957 | Williams | 49/30 |
| 3,303,613 | 2/1967 | Seuntjens | 49/386 X |
| 3,429,074 | 2/1969 | Horton | 49/30 X |
| 4,285,165 | 8/1981 | Persson | 49/30 |
| 5,067,276 | 11/1991 | Brandt | 49/30 X |

*Primary Examiner*—Peter M. Cuomo
*Assistant Examiner*—Jerry Redman
*Attorney, Agent, or Firm*—Harry M. Cross, Jr.

[57] ABSTRACT

The gate of this invention comprises a gate panel 10, a gate hinge mounting means 12 for mounting the gate panel to a hinge post 14 or the like, a gate latching closure means 16 mounted by the gate panel 10 for latching the gate in a closed condition to a latch post 18 or the like, a vehicle-actuatable unlatching means 20 mounted by the gate panel 10 for contact by a vehicle 22 whereby closure means 16 may be unlatched to enable the gate to be swung open by bumping contact from the vehicle 22 from a closed condition 24 to one of two open conditions 26, 28, and a gate latching retaining means 30 mounted by the gate panel 10 for securing the gate to a retaining post 32 or the like in an open condition for a predetermined length of time whereby vehicle 22 may pass through the gate area before the gate is released and allowed to self-close.

5 Claims, 4 Drawing Sheets

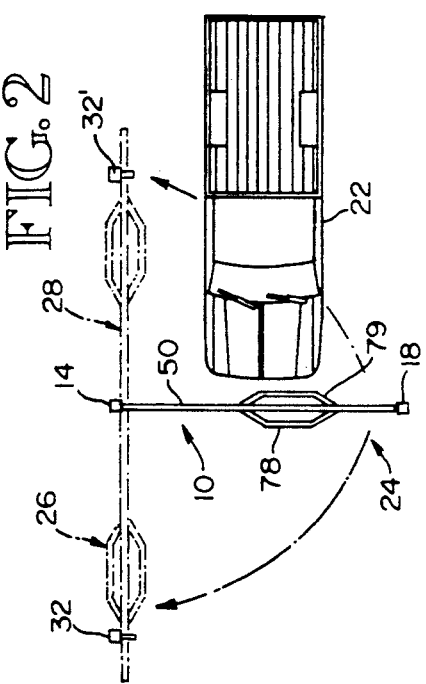
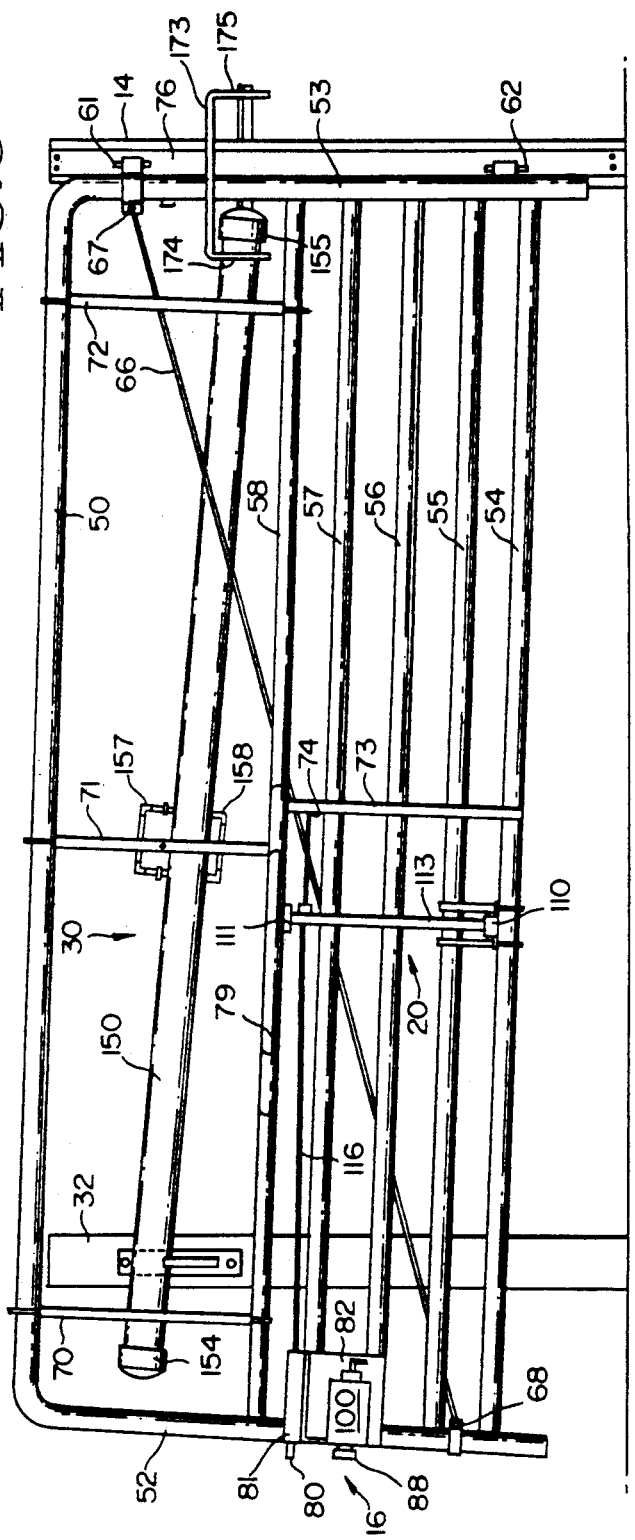

VEHICLE ACTUATED FENCE GATE

FIELD OF THE INVENTION

This invention pertains to fence gates and, more particularly, to such gates designed to be extended across roadways and to be opened by being bumped by a vehicle.

BACKGROUND OF THE INVENTION

Fence gates designed to be extended across roadways and to be opened manually or by contact by a vehicle have been proposed heretofore. Such gates have incorporated designs permitting vehicles to bump the gates with the result that the gates unlatch and swing away from the contacting-vehicles to an open position. Such gates have also been proposed that include designs to secure the gates in an open condition for a sufficient period to permit vehicles to pass by, whereupon the gates are released and allowed to swing back to a closed condition automatically. Mostly, such gates are complicated and cumbersome. For all practical purposes, none of these gate designs, to the inventor's knowledge have found commercial success.

SUMMARY OF THE INVENTION

The present invention is a vehicle actuated fence gate designed to be opened by contact by a vehicle. The mechanism for unlatching the gate of this invention by vehicle contact is simple and durable. The gate of this invention is designed to be unlatched and swung to an open position as a consequence of bumping contact by a vehicle, secured in the open condition for a predetermined length of time, and then automatically released for self-closing to a closed and latched condition. The mechanism for securing the open gate for a predetermined length of time is contained within the gate, is simple and durable.

BRIEF DESCRIPTION OF THE DRAWINGS

FIG. 2 is a schematic plan view illustrating the gate juxtaposed to a pickup truck illustrating the gate in closed condition (in solid line) and in two open positions (in dashed line);

FIG. 3 is a front elevation view of the gate of this invention secured in its open condition;

DETAILED DESCRIPTION OF THE INVENTION

Figure 1:
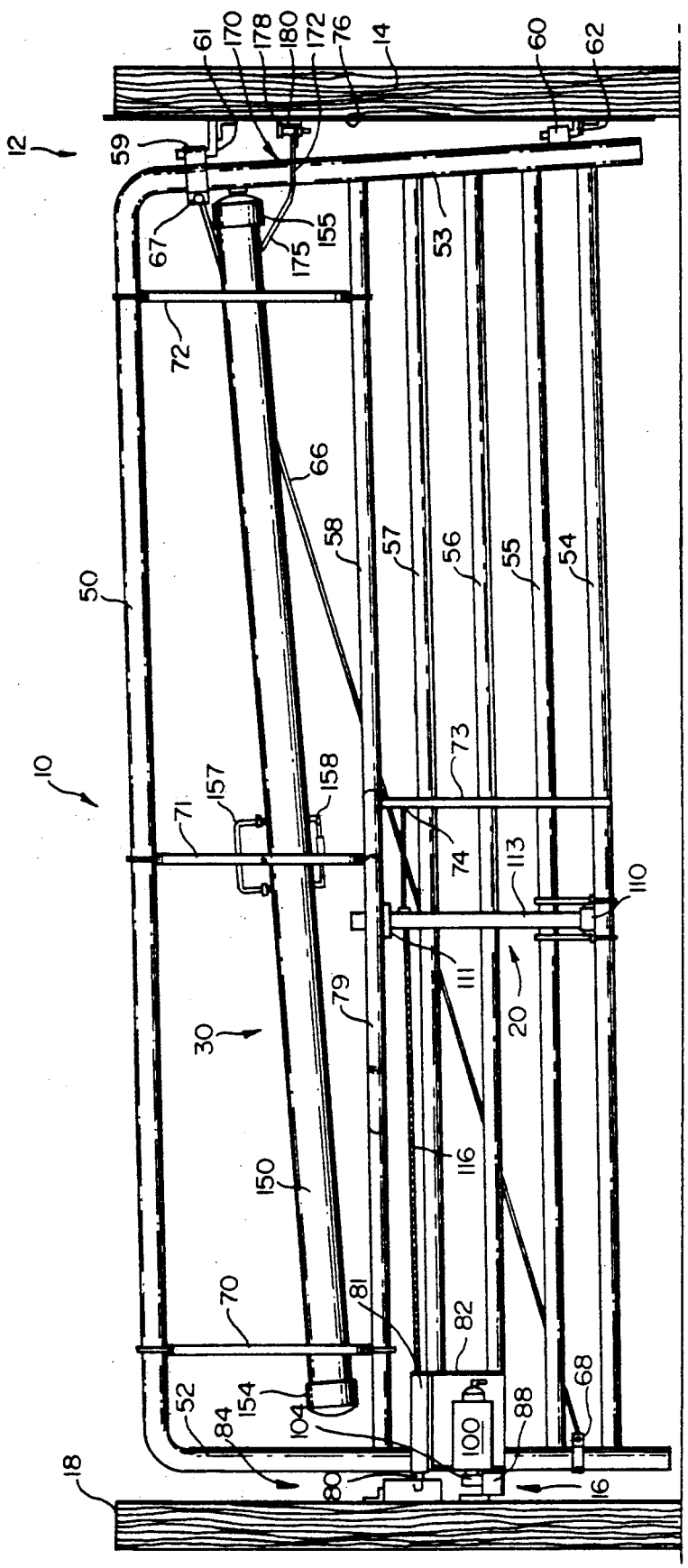
FIG. 1 is front elevation view of the gate of this invention in its closed condition.
Figure 4:
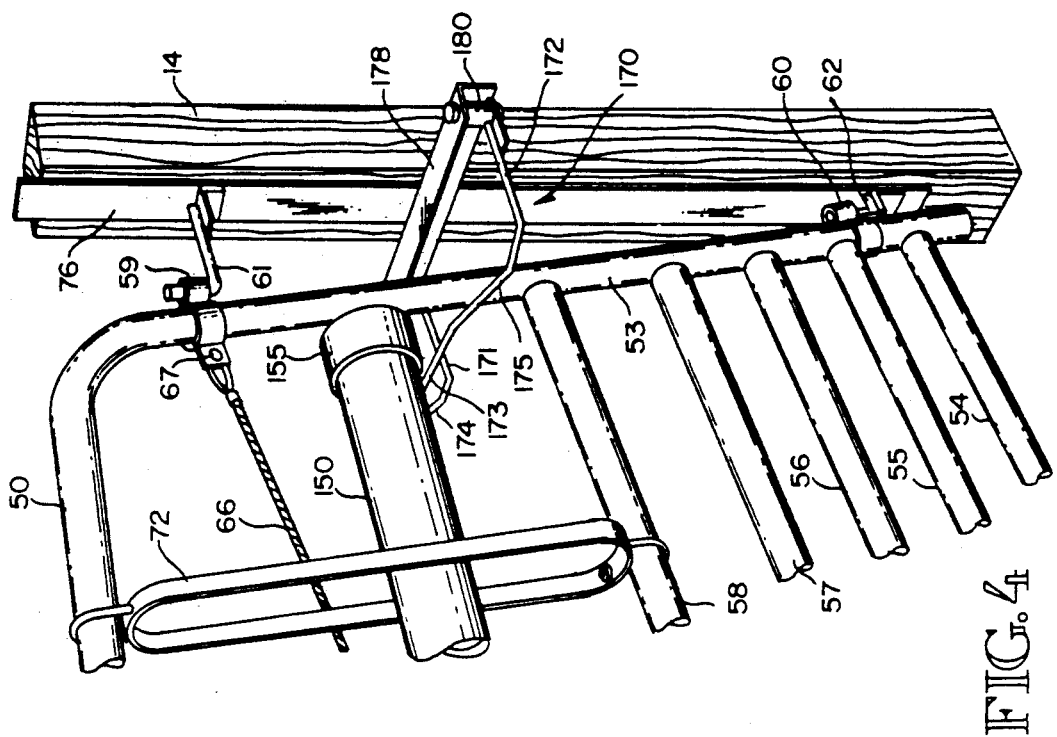
FIG. 4 is partial perspective view of the hinged end of the FIG. 1 gate.
Figure 5:
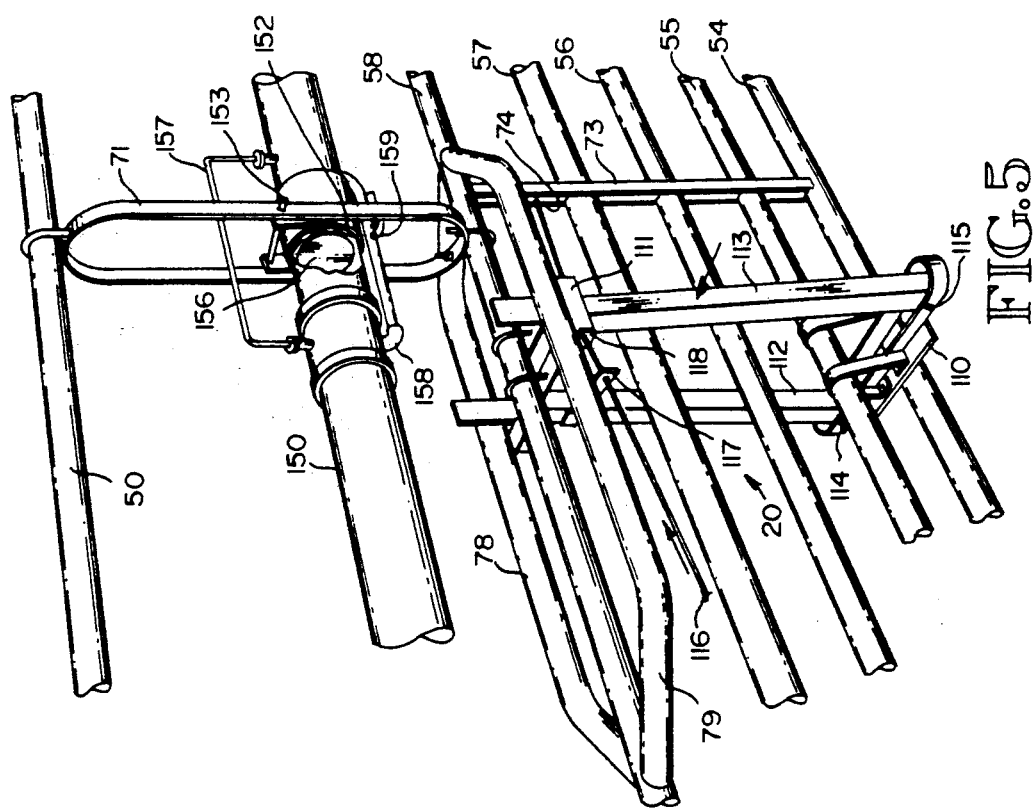
FIG. 5 is a partial perspective view of the mid-section of the FIG. 1 gate.
Figure 6:
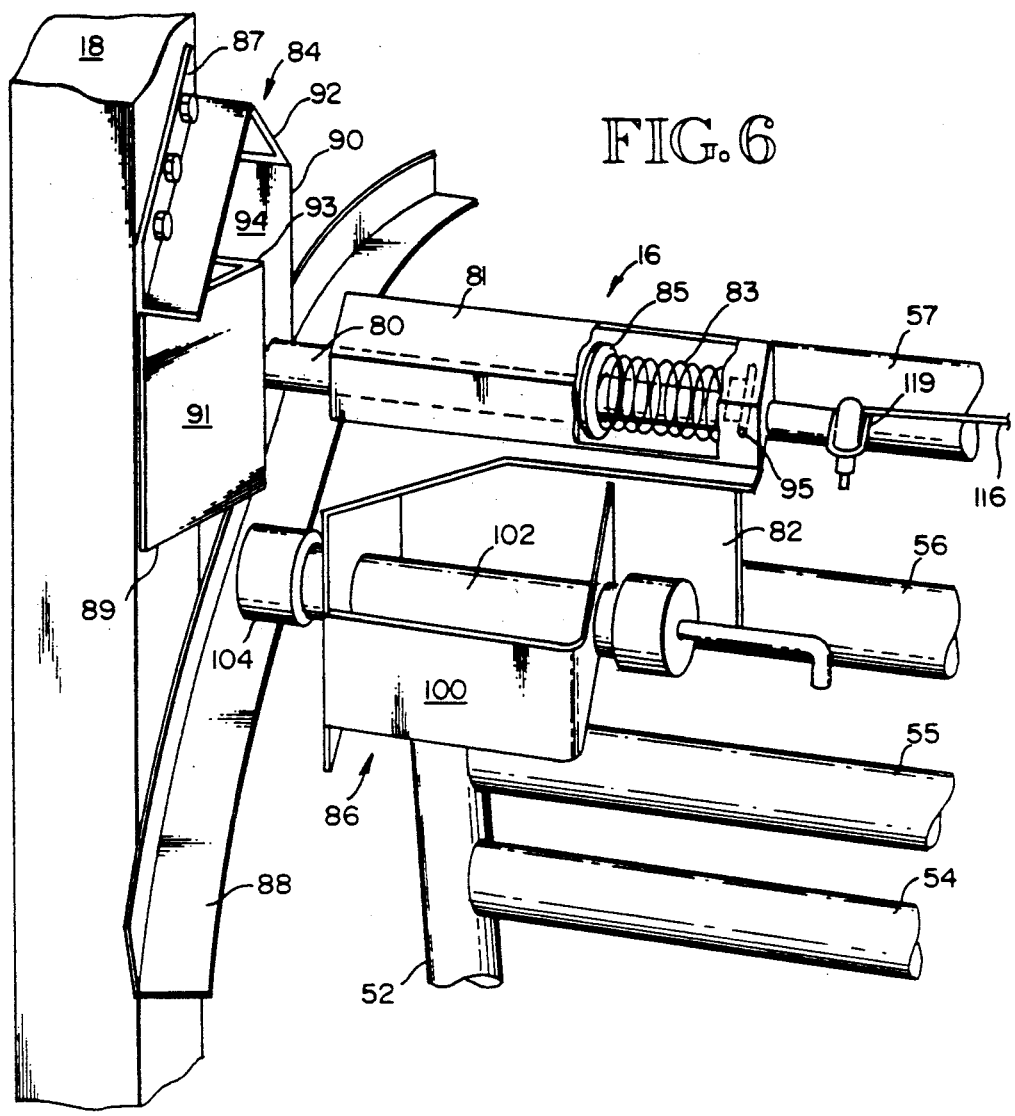
FIG. 6 is a partial perspective view of the free, or latching, end of the FIG. 1 gate in its closed and latched condition.
Figure 7:
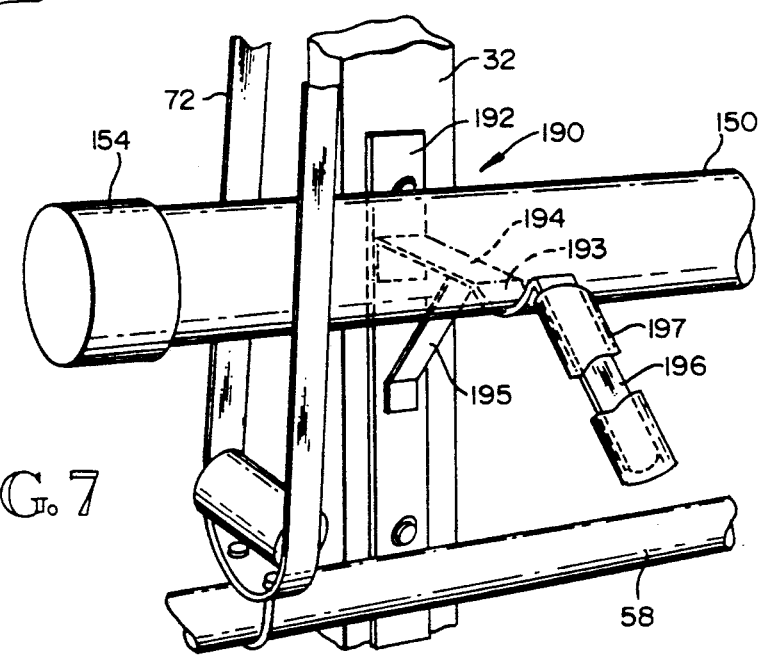
FIG. 7 is a partial perspective view of the free, or latching, end of the FIG. 1 gate secured in its open condition.

The gate of this invention comprises a gate panel 10, a gate hinge mounting means 12 for mounting the gate panel to a hinge post 14 or the like, a gate latching closure means 16 mounted by the gate panel 10 for latching the gate in a closed condition to a latch post 18 or the like, a vehicle-actuatable unlatching means 20 mounted by the gate panel 10 for contact by a vehicle 22 whereby closure means 16 may be unlatched to enable the gate to be swung open by bumping contact from the vehicle 22 from a closed condition 24 to one of two open conditions 26, 28, and a gate latching retaining means 30 mounted by the gate panel 10 for securing the gate to a retaining post 32 or the like in an open condition for a predetermined length of time whereby vehicle 22 may pass through the gate area before the gate is released and allowed to self-close.

In the embodiment illustrated in the drawings, the gate panel 10 comprises a welded metal tubular frame having appropriate top 50, end 52, 53 and cross members 54, 55, 56, 57 and 58. The gate panel may also include a suitable guy wire 66 secured at its ends near the top of end member 53 and the bottom of member 52 at points 67 and 68, respectfully. Cross members 54-58 are located from about the mid-line of the gate panel downward so as to leave a gap or space between the uppermost cross member 58 and the top member 50. Between the uppermost cross member 58 and the top member 50, three vertical stanchion brackets 70, 71, 72 are positioned as shown, near the gate panel end members and at the gate midpoint. A vertical reinforcing member 73 extends from the top cross member 58 to the bottom cross member 54 at the about the midpoint of the gate panel to strengthen the cross members and to provide a gate latch release cable anchor point 74. Bow-shaped bumper guard rails 78, 79, coplanar with the top cross member 58, are welded to the top cross member 58 to protect the vehicle-actuatable unlatching means 20 from livestock.

Hinge mounting means 12 comprises pin hinges 61, 62, preferably welded to an iron mounting bracket 76 that is, itself, fastened to the hinge post 14 by bolts or lag screws. The hinge-post end member 53 is provided with appropriate upper and lower hinge pin mounting brackets 59, 60 for mounting to the upper and lower hinge pins 61, 62 that are secured to hinge post 14.

Gate latching closure means 16 comprises an elongated spring-loaded gate latch pin 80, housed within a metal housing 81 that is mounted by an iron plate 82 to the gate panel cross members 56, 57, a latch plate assembly 84 mounted to the latch post 18 by bolts or lag screws, a brake assembly 86 mounted to plate 82, and a brake rail 88 mounted to the latch post 18. Latch plate assembly 84 comprises a pair of vertical iron angle bars 89, 90, welded to a post attachment plate 87, and oriented with their angle faces 91, 92 outward to provide ramped contact surfaces for the latch pin 80, and oriented with their perpendicular faces 93, 94 parallel to one another to provide a latch pocket therebetween to confine the latch pin 80 when the gate is in its closed position. Latch pin 80 is provided with a coil compression spring 83 that acts between a pin collar 85, mounted on pin 80, and a retaining pin 95 to urge the latch pin 80 outward for confinement within the latch pocket. Brake assembly 86 comprises a shaft housing 100, mounted to plate 82, a brake shaft 102 mounted within housing 100 and cantilevered outward therefrom to mount a cylindrical brake shoe 104. Brake shoe 104 rides on brake rail 88 as the gate completes its opening and closing movements. The ends of brake rail 88 are lower than its midpoint whereby a ramp is provided so that the swinging force of the gate, closing under the force of its own weight, will cause the brake shoe 104 to ride up on the brake rail 88. The brake shoe 104, when it rides up on the ramped brake rail 88, will slow the swinging gate enough that the latch pin 80 can be ramped open by one of the bars 89, 90 and then re-extended by the force of spring 83 into the latch pocket before the gate swings beyond the latching position. Without the provision of a braking assembly, the gate, under the influence of its own weight, could swing beyond the latching position. Also, because the weight of the gate would be fairly substantial, the abrupt latching of the gate would impart a very substantial shock force to the latch post 18, to the members of the latching closure means 16, and to the gate itself, causing undue wear and tear, without the provision of a braking assembly.

The vehicle-actuatable unlatching means 20 comprises a saddle base bracket 110 mounted to the gate panel cross members 54, 55, an upper retainer bracket 111 mounted to cross member 58, a pair of upstanding actuating bars 112, 113 pivotally mounted to base bracket at 114, 115, respectively, and an actuating cable 116. Actuating bars 112, 113 extend upward from the base bracket 110, through the upper retainer bracket 111, and between the upper cross member 58 and the adjacent guard rail (rail 78 in the case of actuating bar 112, and rail 79 in the case of actuating bar 113). Each actuating bar has a transverse cable carrier 117 or 118 mounted to it just below the upper cross member 58 through the actuating cable 116 extends. Actuating cable 116 is connected at one end to the latch pin 80 at 119, extends beneath the upper cross member 58 through the cable carriers 117 and 118, and is connected at its other end to the reinforcing member 73 at 74 such that it is taut.

When one of the vertical actuating bars 112, 113 is pushed toward the gate panel, as a result of being contacted by the bumper of vehicle 22, it will pivot about its lower pivot point 114 or 115 and push the actuating cable 116, extending through the actuating bar's cable carrier 117 or 118, out of line and toward the other actuating bar. Because the actuating cable 116 also extends through the other actuating bar's cable carrier, this pushing of the cable out of line will urge the other actuating bar to pivot away from the gate panel; but such is prevented by the upper retainer bracket 111. Therefore, the actuating cable 116 is pulled as the actuating bar is pushed toward the gate panel; this resulting in the pulling of the latch pin 80 out of engagement with its latching pocket and the unlatching of the gate. As soon as the gate is unlatched, the spring force of latch spring 83 will tend to return the actuating cable 116 and the latch pin 80 to their normal conditions, thereby causing the pivoted actuating bar to return to its normal upright condition. As the actuating bar returns to its normally upright, unpivoted, condition, the gate panel will be sprung away from the contacting vehicle 22 and around to its open condition whereat it is latched and retained for a predetermined length of time to enable vehicle 22 to pass through the gate area.

The gate latching retaining means 30 comprises an elongated tubular pipe 150 that is carried at its midpoint within a pivot bracket 152 that it pivotally mounted within stanchion bracket 71 at 153. The ends of pipe 150 are capped at 154, 155 and an internal diaphragm 156 is located at the pipe's midpoint to separate the pipe's interior into two closed chambers. A vent line 157 is provided in fluid communication with the two internal pipe chambers so that the pressure is equalized between them. A restricted flow liquid line 158 is provided in fluid communication with the two internal pipe chambers so that liquid can pass between the two chambers under controlled conditions. The midpoint diaphragm 156 may be a solid disk or it may be a solid disk provided with one or more small diameter metering holes to permit liquid to transfer between the two chambers. A fixed flow restriction through liquid line 158 may result from the sizing of line 158 or an adjustable flow restriction may be provided by a manual-adjustable flow control valve 159 located within the liquid line 158. A ballast liquid, such as a water and antifreeze solution, in a predetermined quantity is charged into pipe 150.

A pipe carrier bracket 170 is mounted to the hinge post 14 and is configured so as to encircle the gate panel hinge end member 53 and extend far enough from the hinge post 14 to be engageable with the end of pipe 150 adjacent the pipe end cap 155. The configuration of bracket 170 provides two segments, 171, 172, that extend away from the gate post 14 roughly perpendicular thereto, a segment 173 that extends transversely through the gate panel at an elevation above the elevation of segments 171, 172, and two segments 174, 175 that connect segment 171 with one end of segment 173 and that connect segment 172 with the other end of segment 173. A continuous rod or wire is preferably fabricated to provide the segments 171-175 as a continuous member. A mounting bracket 178 is preferably mounted to hinge mounting bar 76 and is adapted to have the free ends of segments 171 and 172 removably fastened thereto as with a bolt and spacer combination 180 Segment 173 of pipe carrier bracket 170 is so positioned and located at an elevation that the hinge-end of pipe 150 (the end having cap end 155), as supported by segment 173, is elevated as shown in FIG. 1 when the gate is in its closed condition. Segments 171, 172 of pipe carrier bracket 170 are so positioned and located at an elevation that the hinge end of pipe 150 (the end having cap end 155) as supported by segment 171 or 172, is not elevated as shown in FIG. 3 when the gate is in its opened condition. Segments 174, 175 of pipe carrier bracket 170 are so positioned and located that the hinge end of pipe 150 will be translated from the lower elevation of segments 171, 173 to the higher elevation of segment 173 as the gate moves from its open condition (FIG. 3) to its closed condition (FIG. 1).

When the gate is in its closed condition as shown in FIG. 1, the ballast liquid within pipe 150 will be located within the interior chamber adjacent the latch pin end of the gate panel. The pipe 150 will be supported at its midpoint by bracket 152 and at its hinge end by segment 173 so that pipe 150 tilts downward toward the latch pin end as shown in FIG. 1. When the gate is opened and swung toward its open condition, such as away from the vehicle 22 depicted in FIG. 2, pipe 150 will remain in the position shown in FIG. 1 because the ballast liquid remains in the chamber adjacent the latch pin end of the gate panel. When the gate reaches its open position, shown in FIG. 3, however, the latch pin end of pipe 150 (the end having cap 154) will be engaged by the gate-open retainer 190 and will be lifted up to an elevated position as shown in FIG. 3. Because the hinge end of pipe 150 has cleared segment 173 and now overlays segment 171, pipe 150 is free to assume the position shown in FIG. 3. When the attitude of pipe 150 is changed by engagement with gate-open retainer 190, the ballast liquid will drain through the liquid line 158 into the hinge end interior chamber of pipe 150. When the ballast liquid has transferred into the hinge end interior chamber of pipe 150, the pipe 150 will become unbalanced with the hinge end half of the pipe heavier that the latch pin end and the pipe end having cap 155 will tip further downward until stopped by contact with segment 171. As pipe 150 tips further downward until contact with segment 171, the latch pin end of pipe 150 (having cap 154) will be lifted clear of the gate-open retainer 190 and the gate panel will be freed to begin its closing swing toward a closed position. The length of time that it takes the ballast liquid to transfer through liquid line 158, beginning when pipe 150 engages gate-open retainer 190 and ending when pipe 150 is tipped free of gate-open retainer 190, is the time during which vehicle 22 has available to clear the gate area. This length of time is adjustable, in the preferred gate of this invention, by predetermining the amount of ballast liquid charged into pipe 150 and by regulating the transfer rate of ballast liquid through liquid line 158 by adjusting flow control valve 159. In a typical farming operation, a gate-open retention time of about fifteen seconds would be sufficient for the vehicle 22 to pass through the gate area. More time might be required for the passage of a farm tractor or for a larger vehicle.

Gate-open retainer 190 comprises a bracket 192 that mounts the assembly to retainer post 32 or 32', a horizontal pipe support bar 194 extending outward from bracket 192 and having a semicircular depression or cup 193 for holding the pipe end in a gate-open condition, a support leg 195 angled upward from bracket 192 to support bar 194 to stiffen bar 194, and a ramp leg 196 extended outward and downward from the support bar cup 194. The ramp leg 196 may be contained within a low-friction, non-marking sheath 197 that would protect the pipe 150 from being scraped or marred when first engaging retainer 190. As the gate is swung to its opened position, pipe 150 in the attitude shown in FIG. 1 will engage ramp leg sheath 197 and be lifted up into support leg cup 193. Cup 193 will be deep enough to hold the pipe comfortably. Because pipe 150 is itself retained by its stanchion brackets 70–72, when pipe 150 seats into cup 193, the gate will be held in the open condition as shown in FIG. 3; until the ballast liquid drains through liquid line 158 into the other interior chamber and the pipe is thus lifted clear of cup 193.

The gate hinges are mounted such that the upper hinge 61 extends outward beyond the lower hinge 62 as shown in FIG. 1. Consequently, when the gate panel is located in the open condition shown in FIG. 3, the gate panel is tilted slightly with the gate panel top member extending outward from the gate panel bottom member. Thus, when the pipe 150 is lifted clear from the support cup 193, the tilt of the gate panel will start the gate moving toward the closed condition. The hinge end member 53 of the gate panel is tipped outward in the closed condition shown in FIG. 1; whereas it is vertical in the open condition shown in FIG. 3. Consequently, the gate panel will tend to continue to swing toward the closed condition when the pipe 150 is lifted clear from the support cup 193 because the closed condition is the equilibrium condition for the gate system.

While the preferred embodiment of the invention has been described herein, variations in the design may be made. The scope of the invention, therefore, is only to be limited by the claims appended hereto.

The embodiments of the invention in which an exclusive property is claimed are defined as follows:

1. In a vehicle-actuatable fence gate comprising a gate panel having a free end and a hinge end, gate hinge mounting means for mounting the gate panel to a hinge post of the like, gate latching closure means mounted by the gate panel for latching the gate in a closed condition to latch post or the like, vehicle-actuatable unlatching means mounted by the gate panel for contact by a vehicle passing through a gate area whereby the gate latching closure means may be unlatched to enable the gate to be swung open by bumping contact from a vehicle from a closed condition to an open condition, the improvement comprising:

a) gate latching retaining means mounted by the gate panel for securing the gate to a retaining post or the like for a predetermined length of time whereby a vehicle may pass through the gate area before the gate is released and allowed to self close; said gate latching retaining means comprising an elongated pipe or the like having an elongated interior therein, longitudinally-mounted within the gate panel and pivotally-supported within the gate panel for tilting movement within the gate panel about a transverse pivot axis; means dividing the interior of said pipe into two longitudinally-adjacent chambers, one such chamber being a free-end pipe chamber adjacent the free end of the gate and the other such chamber being a hinge-end pipe chamber adjacent the hinge end of the gate; means providing for liquid transfer between the two chambers; a ballast liquid contained within said pipe;

b) gate-open retainer means mountable to a retaining post of the like and so constructed and arranged to engage a free-end of the pipe at the gate free end when the gate is opened and hold it at an elevation above a hinge-end of the pipe at the gate hinge end whereby said ballast liquid will transfer from one pipe chamber to the other pipe chamber, and to release the free-end pipe end after a predetermined length of time whereby the gate may swing closed on its own; and c) pipe carrier means mountable to a hinge post or the like for supporting the hinge-end of the pipe, said pipe carrier means being so constructed and arranged to support the adjacent hinge-end pipe end at an elevation higher than the free-end pie end when the gate panel is in a closed condition whereby liquid ballast will transfer into the free-end pipe chamber, and to support the adjacent hinge-end pipe end at an elevation lower than the free-end pipe end when the gate panel is in an open condition, and to lift the adjacent pipe end from the lower elevation to the higher elevation when the gate is moved from an open condition to a closed condition whereby liquid ballast will transfer from the hinge-end pipe chamber into the free-end pipe chamber.

2. The gate of claim 1 wherein said pipe carrier means comprises a pipe carrier bracket having a first reach extending transversely through the gate panel to carry the hinge-end pipe end at the higher elevation when the gate is in a closed condition; a second reach for carrying the hinge-end pipe end at the lower elevation when the gate is in a open condition; and a third reach interconnecting the first and second reaches for translating the hinge-end pipe end from the lower elevation to the higher elevation as the gate is moved from an open condition to a closed condition.

3. The gate of claim 2 wherein said gate panel includes an upright hinge-end member, and said pipe carrier means comprises a continuous rod or the like configured to encircle the gate panel hinge-end member and to extend far enough from a gate-mounting hinge post or the like to be engageable with the hinge-end pipe end; the continuous rod having two segments mountable to a hinge post or the like and extendable away therefrom, a third segment that extends transversely through the gate panel at an elevation above the elevation of the first two segments, and fourth and fifth segments that connect the third segment to the first and second segments; the third segment constituting a first reach, the first two segments both constituting a second reach; and the fourth and fifth segments both constituting a third reach; the segments being so constructed and arrange that the pipe carrier means may be operable when the gate is opened in either direction to support and translate the hinge-end pipe end as aforementioned.

4. The gate according to claim 1 wherein the gate-open retainer means for engaging the free-end pipe end and elevating and holding such pipe end comprises a bracket providing a cup within which the free-end pipe end will set to hold the gate in an open condition until ballast liquid has transferred to the other pipe chamber.

5. The gate according to claim 1 wherein the gate latching closure means comprises a latch pin mounted by the gate panel and springloaded toward a latching condition in a latching pocket provided by the latch post or the like; means coupling the latch pin to the vehicle-actuatable unlatching means whereby bumping contact by a vehicle will retract the latch pin from a latching condition; first brake means mountable by a latch post or the like; second brake means mounted by the gate panel and engageable with the first brake means when the gate is closed to slow the gate as it is closed to a point where the latch pin can securely engage the latching pocket.

* * * * *